United States Patent
Bengtsson et al.

(10) Patent No.: US 12,483,458 B2
(45) Date of Patent: Nov. 25, 2025

(54) METHODS FOR COMMUNICATING N+1 BITS AND RELATED NODES

(71) Applicant: Sony Group Corporation, Tokyo (JP)

(72) Inventors: Erik Bengtsson, Eslöv (SE); Fredrik Rusek, Eslöv (SE); Jose Flordelis, Lund (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/718,022

(22) PCT Filed: Dec. 19, 2022

(86) PCT No.: PCT/EP2022/086557
§ 371 (c)(1),
(2) Date: Jun. 8, 2024

(87) PCT Pub. No.: WO2023/117845
PCT Pub. Date: Jun. 29, 2023

(65) Prior Publication Data
US 2024/0340212 A1 Oct. 10, 2024

(30) Foreign Application Priority Data
Dec. 22, 2021 (SE) .................... 2151598-6

(51) Int. Cl.
*H04L 27/34* (2006.01)

(52) U.S. Cl.
CPC ...... *H04L 27/3433* (2013.01); *H04L 27/3483* (2013.01)

(58) Field of Classification Search
CPC ................... H04L 27/3483; H04L 27/3433
See application file for complete search history.

(56) References Cited

U.S. PATENT DOCUMENTS

| | | |
|---|---|---|
| 8,792,324 B2 | 7/2014 | Petrov et al. |
| 2015/0200747 A1 | 7/2015 | Petrov |
| 2016/0049999 A1 | 2/2016 | Taherzadeh Boroujeni et al. |
| 2016/0365945 A1 | 12/2016 | Bakulin et al. |

(Continued)

FOREIGN PATENT DOCUMENTS

| | | |
|---|---|---|
| CN | 110113107 B | 5/2021 |
| WO | 2020020663 A1 | 1/2020 |

OTHER PUBLICATIONS

International Search Report and Written Opinion from corresponding International Application No. PCT/EP2022/086557, mailed on Mar. 29, 2023, 21 pages.

(Continued)

*Primary Examiner* — Rahel Guarino
(74) *Attorney, Agent, or Firm* — Tucker Ellis LLP

(57) ABSTRACT

Disclosed is a method, performed by a transmit node, for transmitting N+1 bits to a receive node. N is a positive integer. The method comprises producing a modulation element by mapping the N+1 bits to a constellation point of a N-dimensional tuneable constellation, wherein the N-dimensional tuneable constellation is derived using a constellation tuning parameter. The method comprises determining, based on N, one or more physical resource elements for the modulation element. The method comprises transmitting, to the receive node, the modulation element, using the physical resource elements.

30 Claims, 8 Drawing Sheets

(56) References Cited

U.S. PATENT DOCUMENTS

2019/0215222 A1* 7/2019 Cheng ................ H04L 5/0021
2020/0206633 A1 7/2020 Shiigi et al.

OTHER PUBLICATIONS

Office Action and Search Report from corresponding Swedish Application No. 2151598-6, mailed on Aug. 9, 2022, 10 pages.
M. Taherzadeh et al., "SCMA Codebook Design", IEEE 80th Vehicular Technology Conference, Sep. 2014, 5 pages.
A. Mirani et al., "Low-Complexity Geometric Shaping", Journal of Lightwave Technology, vol. 39, No. 2, Jan. 15, 2021, pp. 363-371.
T. Peng et al., "An Adaptive Optimal Mapping Selection Algorithm for PNC Using Variable QAM Modulation", IEEE Wireless Communications Letters, vol. 8, No. 2, Apr. 2019, pp. 412-415.

* cited by examiner

METHODS FOR COMMUNICATING N+1 BITS AND RELATED NODES

The present disclosure pertains to the field of wireless communications. The present disclosure relates to a method for transmitting N+1 bits to a receive node, a method for receiving N+1 bits from a transmit node, a related transmit node, and a related receive node.

BACKGROUND

In New Radio, NR, modulation schemes like Quadrature Phase-Shift Keying, QPSK and/or 16 Quadrature Amplitude Modulation, 16-QAM are used. These modulation schemes may not provide an acceptable rate under certain Signal to Noise Ratio, SNR. Other modulation schemes, such as 8-QAM, can be used but require comparable or higher demodulation complexity than 16-QAM.

SUMMARY

Accordingly, there is a need for nodes and methods which may mitigate, alleviate, or address the shortcomings existing and may provide an improved achievable rate while maintaining a reduced demodulation complexity, such as less than 8-QAM. Albeit the computational complexity associated to demodulation of low-order constellations, such as 8-QAM and 16-QAM, is low compared to other stages of a digital communication system receiver, this complexity cannot be ignored, and it remains an objective to devise constellations with even smaller demodulation complexity.

Disclosed is a method, performed by a transmit node, for transmitting N+1 bits to a receive node. N is a positive integer. The method comprises producing a modulation element, for example by mapping the N+1 bits to a constellation point of a N-dimensional tuneable constellation. The N-dimensional tuneable constellation is derived using a constellation tuning parameter. The method can comprise determining, based on N, one or more physical resource elements for the modulation element. The method can comprise transmitting, to the receive node, the modulation element, using the physical resource elements.

Further, a transmit node is provided, the transmit node comprising memory circuitry, processor circuitry, and a wireless interface, wherein the transmit node is configured to perform any of the methods disclosed herein.

It is an advantage of the present disclosure that the disclosed method and the disclosed transmit node can achieve a target rate that is higher than the rate provided by QPSK, by providing a tuneable multi-dimensional constellation of the modulation scheme. The disclosed method and disclosed transmit node can enable a reduced demodulation complexity (e.g. compared to the complexity of 16-QAM and/or of 8-QAM), and thereby an increased demodulation computational speed at the receive node. The disclosed method and the disclosed transmit node can provide more flexibility in the selection of Modulation and Coding Schemes, MCS.

Disclosed is a method, performed by a receive node, for reception of N+1 bits. The method comprises receiving, from a transmit node, using physical resource elements, a signal. The method can comprise obtaining, based on the signal and a N-dimensional tuneable constellation, a parameter indicative of a likelihood of the N+1 bits being 0 or 1. The N-dimensional tuneable constellation is derived using a constellation tuning parameter. The method can comprise providing the parameter to a decoder.

Further, a receive node is provided, the receive node comprising memory circuitry, processor circuitry, and a wireless interface, wherein the receive node is configured to perform any of the methods disclosed herein.

It is an advantage of the present disclosure that the disclosed method and the disclosed receive node can benefit from a reduced demodulation complexity (e.g. compared to the complexity of 16-QAM and/or of 8-QAM), and thereby an increased demodulation computational speed while achieving a target rate that is higher than the rate provided by QPSK. The disclosed method and the disclosed receive node can provide more flexibility in the selection of Modulation and Coding Schemes, MCS.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
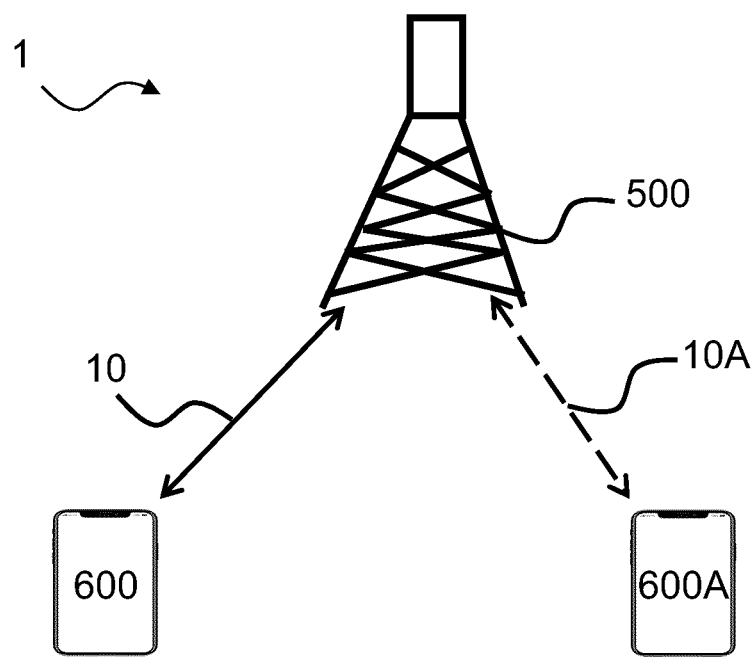
FIG. 1 is a diagram illustrating an example wireless communication system comprising an example transmit node and an example receive node according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

FIG. 1 is a diagram illustrating an example wireless communication system 1 comprising an example transmit node and an example receive node according to this disclosure.

As discussed in detail herein, the present disclosure relates to a wireless communication system 1 comprising a cellular system, for example, a 3GPP wireless communication system. The wireless communication system 1 comprises an example transmit node and an example receive node according to this disclosure. The wireless communication system 1 described herein may comprise one or more transmit node and one or more receive nodes.

In one or more examples, the transmit node can be a network node, such as network node 500 while the receive node can be a wireless device, such as wireless device 600.

In one or more examples, the transmit node can be a wireless device, such as wireless device 600 while the receive node can be a network node, such as network node 500.

A wireless device may refer to a mobile device and/or a user equipment, UE.

A network node disclosed herein refers to a radio access network node operating in the radio access network, such as a base station, an evolved Node B, eNB, gNB in NR. In one or more examples, the RAN node is a functional unit which may be distributed in several physical units.

The wireless communication system 1 described herein may comprise one or more wireless devices 600, 600A, and/or one or more network nodes 500, such as one or more of: a base station, an eNB, a gNB and/or an access point.

The wireless device 600, 600A may be configured to communicate with the network node 500 via a wireless link (or radio access link) 10, 10A.

The term "tuneable" used herein may be seen as the ability to be tuned. Other formulation of tuneable may be used, such as tunable, in one or more examples.

Figure 2:
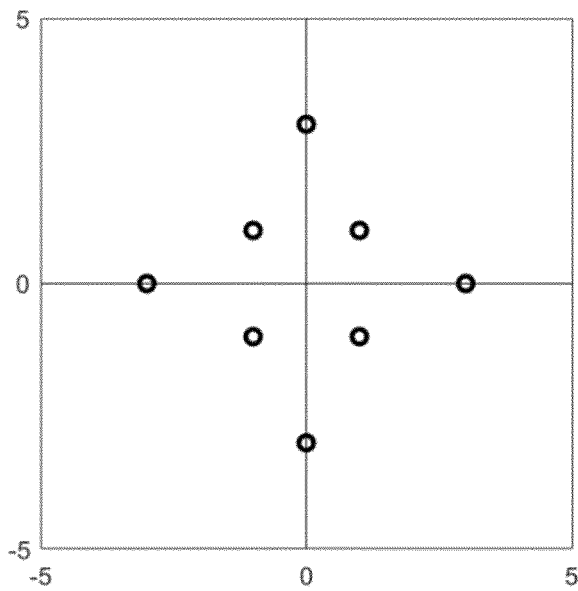
FIG. 2 is a diagram illustrating an example 8-ary constellation, such as 8-QAM.
Figure 3:
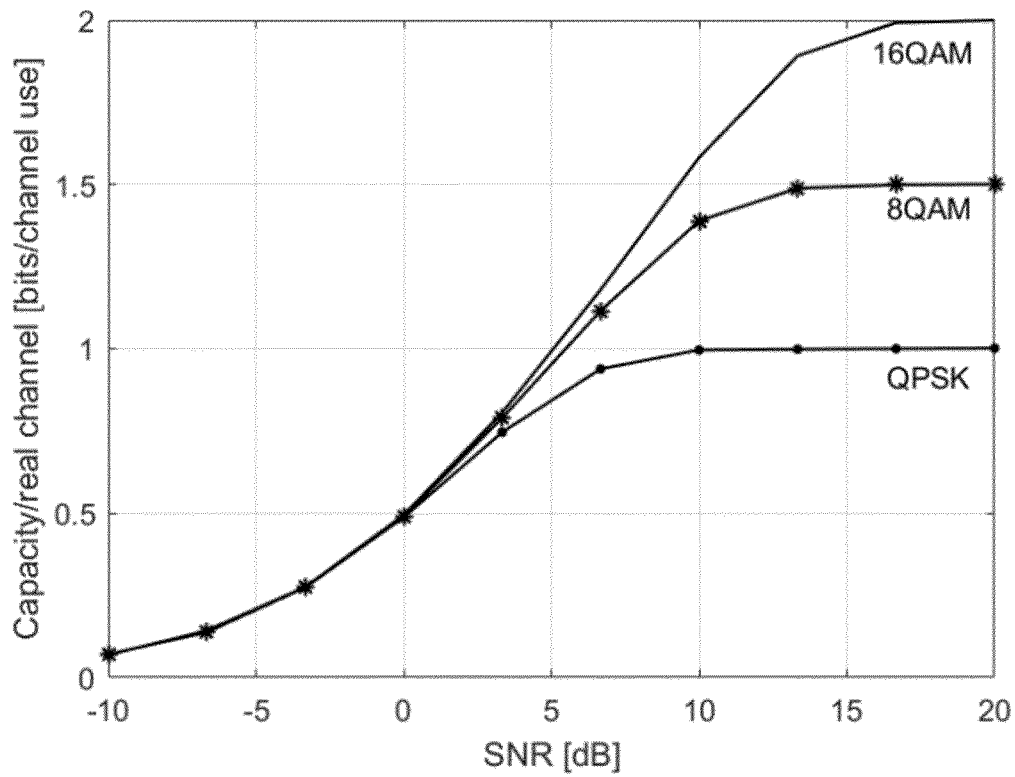
FIG. 3 is a graph illustrating example achievable rates for QPSK, 8QAM, and 16QAM vs SNR.

FIG. 2 is a diagram illustrating an example 8-ary constellation, such as 8-QAM. The 8-ary constellation illustrated in FIG. 2 shows constellation points forming the 8-ary constellation arranged in a 2-dimension grid. The x-axis may be seen as denoting I (e.g. in-phase) and the y-axis may be seen as denoting Q (e.g. quadrature) for IQ constellation point. The collection of all constellation points may be seen as an IQ constellation. QPSK and 16QAM constellations are used in communication systems more than 8-QAM. The rates provided by the three constellations, QPSK, 8-QAM, 16-QAM are shown in FIG. 3. FIG. 3 shows a graph illustrating example achievable rates for QPSK, 8QAM, and 16QAM vs SNR. The y-axis may express the rate per real dimension (I/Q).

FIG. 3 shows that when the SNR is 3-4 dB or so, the rate for QPSK starts to saturate, and a switch can be done to 8-QAM. But in NR and most other systems, 8-QAM is not implemented, so a switch to 16QAM occurs instead.

8-QAM is not used because 8-QAM has a comparable demodulation complexity to 16-QAM but provides a lower rate that 16-QAM. The demodulation complexity of 8-QAM may be due to the constellation is not separable into independent I and Q components. 8 PSK can be used but is a weaker constellation than 8-QAM, in that the minimum Euclidean distance for 8 PSK is smaller than that of 8-QAM. In other words, it may be seen that a weaker constellation may be a constellation providing a smaller Euclidean distance, which may result into 8 PSK requiring a larger SNR for a same capacity-per-real-channel, compared to 8QAM.

The present disclosure provides a technique with a plurality of constellations (such as set of constellations, a collection of constellations, and/or a family of constellations) that operate and provide a rate that is between the rates of QPSK and 8QAM of FIG. 3. The rate achieved by 8-QAM can also be achieved by the disclosed constellations. Most importantly, the disclosed technique provides demodulation complexity lower than that of 8-QAM.

The present disclosure provides a method for transmitting N+1 bits by producing a modulation element. The modulation element can be produced by mapping the N+1 bits to a constellation point of a N-dimensional tuneable constellation. The N-dimensional tuneable constellation is derived using a constellation tuning parameter. For example, the modulation element can include one or more real values.

For example the N+1 bits are transmitted in N real-valued signal dimensions. N is a positive integer. For example, the N+1 bits are transmitted as N real-valued signals simultaneously in a total of N I and Q components. Per real dimensions (i.e., I or Q), a maximum rate of 1+1/N is obtained.

For N=2, 3, 4, the rates obtained are respectively 1.5, 1.33, 1.25. These rates may be seen as equivalent to rates offered by 8QAM, "6.32" QAM, and "5.66" QAM. The latter two do not exist, but highlights the advantage of the disclosed method.

In N real dimensions, the transmit node disclosed herein can send a signal constructed as $$\begin{bmatrix} s_1 \\ s_2 \\ \vdots \\ s_N \end{bmatrix} = \sqrt{E} \begin{bmatrix} 1 & 0 & 0 & 0 & a \\ 0 & 1 & 0 & 0 & a \\ 0 & 0 & \ddots & 0 & \vdots \\ 0 & 0 & 0 & 1 & a \end{bmatrix} \begin{bmatrix} x_1 \\ x_2 \\ \vdots \\ x_N \\ x_{N+1} \end{bmatrix} \quad (1)$$

where the vector including all $S_k$ denotes the modulation element (in other word the modulation element may be seen as a vector comprising one or more $S_k$),
a denotes the constellation tuning parameter,
E denotes a power scaling parameter, such as a scaling constant to normalize power, and $x_k$ denotes the bits for transmission.

Figure 4:
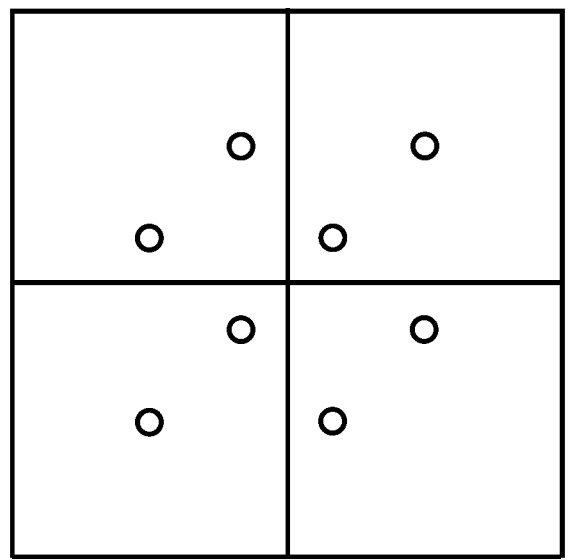
FIG. 4 is a diagram illustrating an example constellation, with N=2, according to one or more examples of this disclosure.

FIG. 4 is a diagram illustrating an example constellation, with N=2, according to one or more examples of this disclosure. In other words, FIG. 4 illustrates a 2-dimensional constellation according to this disclosure, including 8 constellation points. The achievable rate of this constellation is provided by curve 61 of FIG. 6. The rate is quite close to 8-QAM but provides much lower complexity than 8-QAM. The constellation tuning parameter is set to 0.5 in this example.

Figure 5:
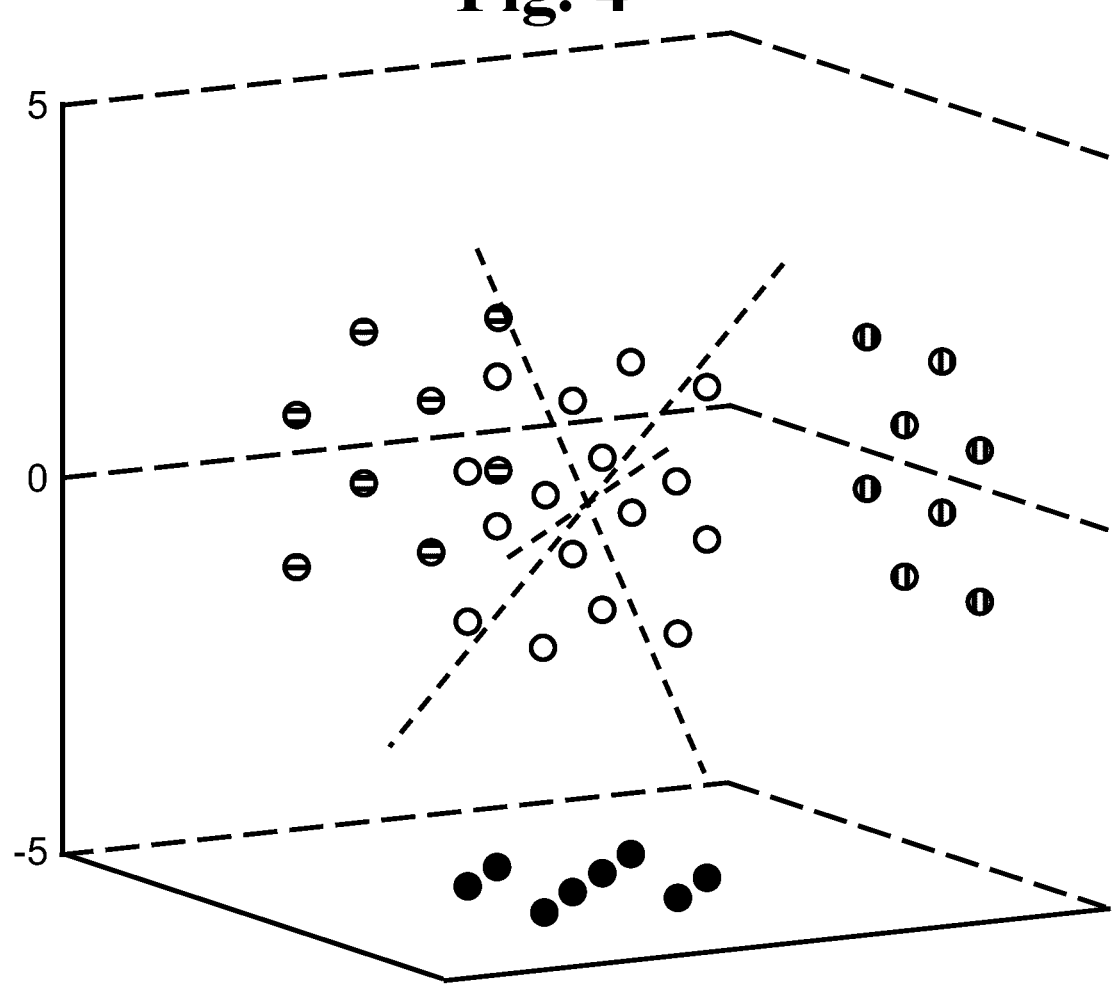
FIG. 5 is a diagram illustrating an example constellation, with N=3, according to one or more examples of this disclosure.

FIG. 5 is a diagram illustrating an example constellation, with N=3, according to one or more examples of this disclosure. Further, for N=3, FIG. 5 shows the projections of the constellation points (illustrated as white circles) on the X-Y plane as black circles. The projections of the constellation points on the X-Z plane are illustrated as vertically striped circles. The projections of the constellation points on the Y-Z plane are illustrated as horizontally striped circles. The constellation tuning parameter is set to 0.5 in this example, such as a=0.5.

Figure 6:
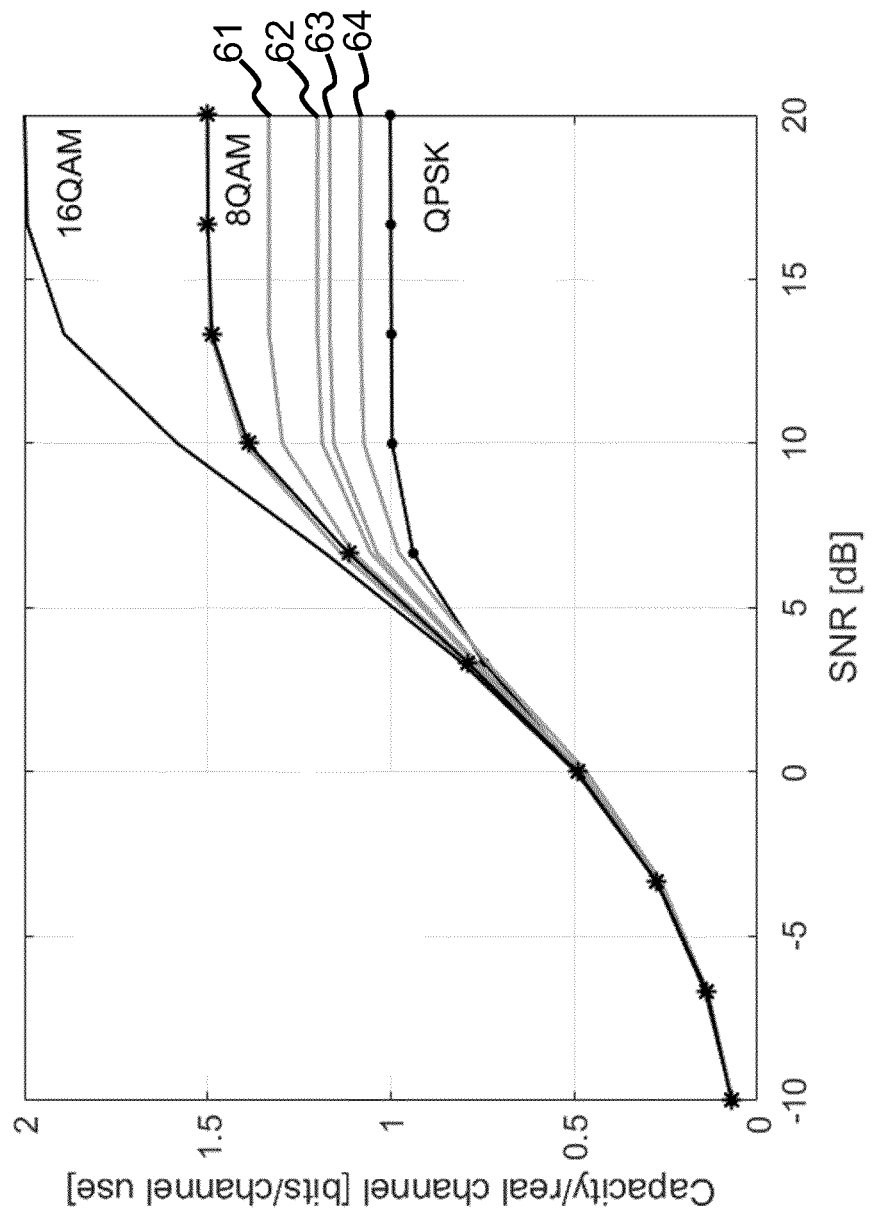
FIG. 6 is a graph illustrating example achievable rates for a family of tuneable constellations according to one or more examples of this disclosure.

FIG. 6 is a graph illustrating example achievable rates for a family of tuneable constellations for various N according to one or more examples of this disclosure. The y-axis may express the rate per real dimension (I/Q). Curve 61 of FIG. 6 shows the achievable rate for N=2. Curve 62 of FIG. 6 shows the achievable rate for N=3. Curve 63 of FIG. 6 shows the achievable rate for N=4. Curve 64 of FIG. 6 shows the achievable rate for N=5.

The constellation tuning parameter may be seen as parameter used to tune (such as customize, adjust, modify, conform) the constellation of the modulation scheme. The constellation parameter may be optimized. The constellation parameter may be a predetermined value. The constellation parameter may be a fixed value.

For example, the constellation parameter may be set to a predetermined value, for example, a=0.5. In one or more example, other values (such as smaller) provide superior rates at low SNR. In particular, a=1/N may be a performance choice, but for reasonable values of N (e.g. 3-6), the improvement when comparing to a=0.5 may be marginal.

For various N and a=0.5, the resulting rates are illustrated in FIG. 6.

The plurality of constellations disclosed herein can operate in between QPSK and 8/16-QAM as illustrated in FIG. 6. However, in order to be practically useful, their demodulation should have low complexity, such as lower than 8/16-QAM. The precise form of the matrix linking the variables s and x illustrated in Equation (1) allows for this.

A Max-log-MAP (Maximum A Posteriori) Log Likelihood Ratio LLR of $x_{N+1}$ can be obtained as for example:

$$L(x_{N+1}) = \log \frac{\max_{x_1,\ldots,x_N; x_{N+1}=-1} p(y|x)}{\max_{x_1,\ldots,x_N; x_{N+1}=1} p(y|x)} = \quad (2)$$

$$\frac{4}{N_0}\left[a\sqrt{E}\sum_{n=1}^{N} y_n - aE(N^+ - N^-) - \sqrt{E}\sum_{n\in S^0} y_n\right]$$

where $S^0$ denotes the set of all n such that $-a \leq y_n \leq a$,
$N^+$ denotes the number of indices n such that $y_n > a$ and
$N^-$ denotes the number of indices n such that $y_n < -a$.

Equation (2) shows that demodulation of the bit has extremely low complexity.

Demodulation of $x_1, \ldots, x_N$ is even less intensive or expensive. For example, for $1 \leq n \leq N$, the following holds for received signal $y_n$:

$$p(y_1, \ldots, y_N | x_n) =$$

$$p(y_1, \ldots, y_{n-1}, y_{n+1}, \ldots y_N | x_n) p(y_n | y_1, \ldots, y_{n-1}, y_{n+1}, \ldots y_N, x_n) =$$

$$p(y_1, \ldots, y_{n-1}, y_{n+1}, \ldots y_N) \frac{1}{2}\sum_{a=\pm 1}$$

$$p(y_n | y_1, \ldots, y_{n-1}, y_{n+1}, \ldots y_N, x_n, x_{N+1} = a) =$$

$$p(y_1, \ldots, y_{n-1}, y_{n+1}, \ldots y_N)\frac{1}{2}\sum_{a=\pm 1} p(y_n | x_n, x_{N+1} = a) \propto$$

$$\frac{1}{2}\sum_{a=\pm 1} p(y_n | x_n, x_{N+1} = a)$$

which implies that demodulation of $x_n$ requires a search over a quaternary set. However, $x_{N+1}$ is already determined in Equation (2), so introducing $x_{N+1}=-\text{sign}(L(x_{N+1}))$ relaxes the complexity to a binary search. In other words, the complexity is reduced to be the same as for 2-PAM.

Figure 7:
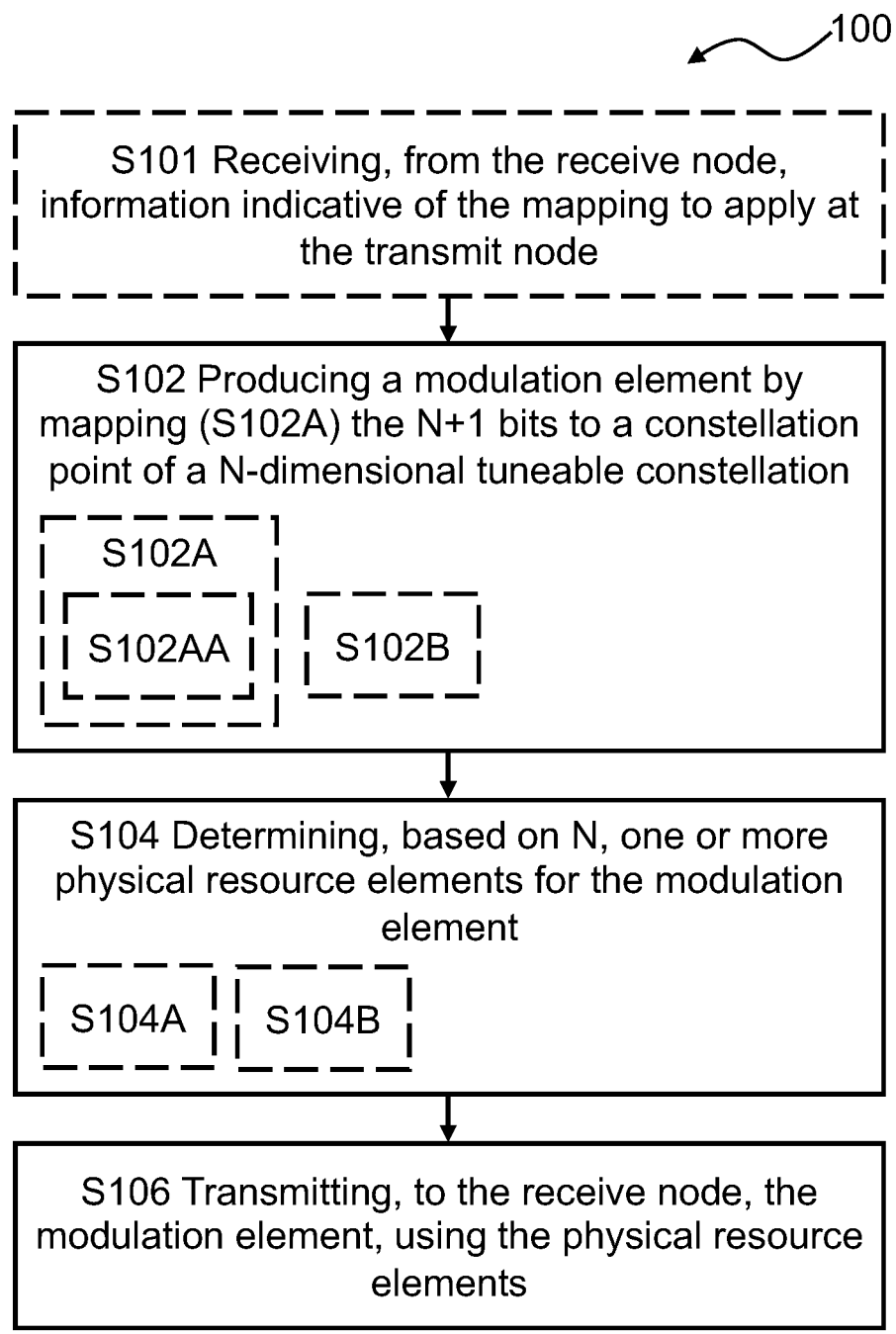
FIG. 7 is a flow-chart illustrating an example method, performed by a transmit node, for transmitting N+1 bits according to this disclosure.
Figure 9:
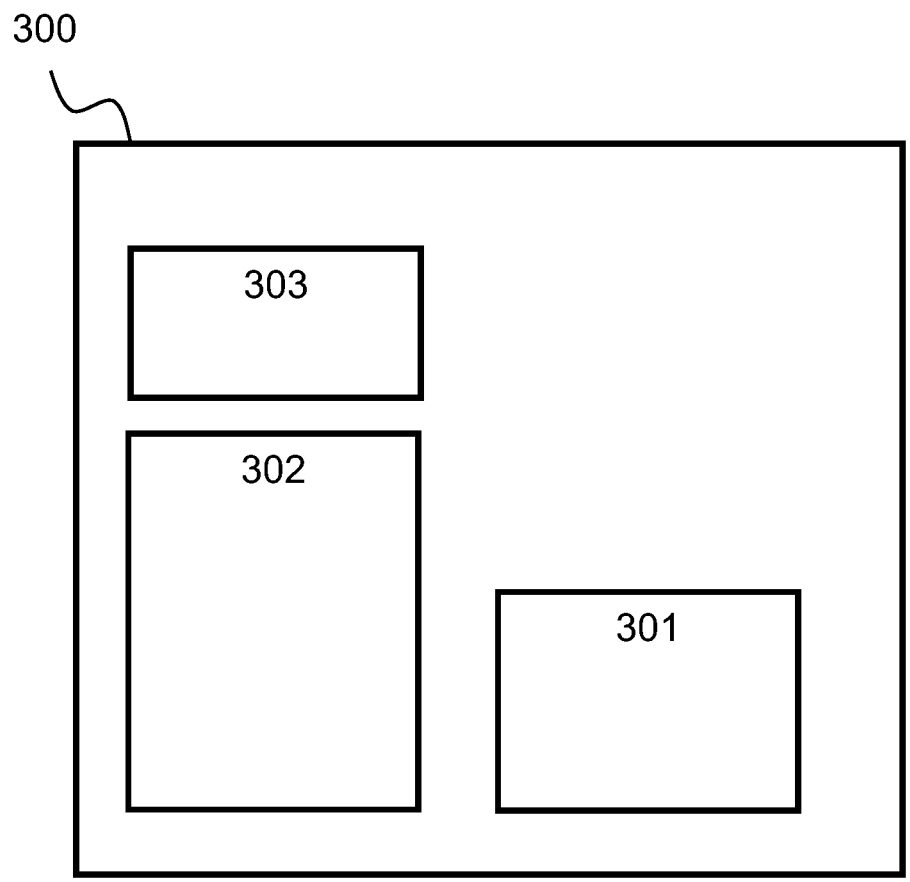
FIG. 9 is a block diagram illustrating an example transmit node according to this disclosure.

FIG. 7 shows a flow diagram of an example method 100, performed by a transmit node according to the disclosure, for example by the transmit node disclosed herein (such transmit node of FIG. 1, and FIG. 9.). The method 100 may be seen as a method for providing N+1 bits to a receive node, such as for transmitting N+1 bits to a receive node.

The transmit node can be for example one or more of: a network node and/or a wireless device disclosed herein.

The method 100 comprises producing S102 a modulation element. For example, the modulation element can be produced by the transmit node by mapping S102A the N+1 bits to a constellation point of a N-dimensional tuneable constellation. In one or more examples, the transmit node can map a bit of the N+1 bits to a constellation point of the N-dimensional tuneable constellation. In other words, each bit of the N+1 bits can be mapped to a constellation point of the N-dimensional tuneable constellation. In one or more example methods, the modulation element comprises at least one modulation symbol corresponding to the constellation point. For example, the modulation element may include one or more modulation symbols where each modulation symbol corresponds to a constellation point obtained from the mapping S102A. For example, the modulation element may include a set of N modulation symbols where each modulation symbol corresponds to a constellation point obtained from the mapping S102A. The modulation element may be seen as a vector comprising one or more modulation symbols.

The N-dimensional tuneable constellation may be seen as a constellation that has N dimensions and can be tuned (such as customized, such as configured). The N-dimensional tuneable constellation may include a plurality of constellation points. The N-dimensional tuneable constellation may be seen as a signal constellation, such as constellation scheme, where a constellation is a collection of constellation points.

A modulation element can be seen as at least one modulation symbol (with the meaning given in TS 38.211 version 16.7.0 and/or version 15.0.0). The mapping may be seen as a modulation function mapping N+1 bits to N real numbers. For example, the mapping can be a linear transformation given by a matrix or another mapping function.

In one or more example methods, the modulation element comprises one or more real values. In other words, a modulation symbol included in the modulation element can be a real valued modulation symbol. For example, each modulation symbol of the modulation element can be a real valued modulation symbol. For example, the modulation element may include a set of N modulation symbols where each modulation symbol is a real valued modulation symbol.

In one or more example methods, the modulation element comprises one or more complex values. In other words, a modulation symbol included in the modulation element can be a complex valued symbol. For example, each modulation symbol of the modulation element can be a complex valued modulation symbol. For example, a bit can be mapped to a complex-valued modulation symbol.

The N-dimensional tuneable constellation can be derived using a constellation tuning parameter. In other words, the N-dimensional constellation can be tuned and determined using the constellation tuning parameter.

The constellation tuning parameter may be seen as a parameter used to tune the constellation of the modulation scheme. In one or more example methods, the constellation tuning parameter is configured for obtaining a target transmission rate. In other words, the constellation tuning parameter can impact or affect the performance of the modulation scheme. For example, at different SNRs, different tuning parameters are optimal. In one or more example methods, the constellation tuning parameter is configured to adapt to the SNR so as to achieve and/or optimize a target transmission rate. The target transmission rate may be seen as a transmission bit rate, such as the rate for transmitted bits. For example, the constellation tuning parameter can change the performance of the scheme and for each SNR, there is an optimal constellation tuning parameter that allows for a maximal transmitted bitrate of the transmit node. In other words, the constellation tuning parameter can change the structure of the N-dimensional tuneable constellation. Stated differently, determining a suitable constellation tuning parameter may allow for the maximum transmission rate. For example, for a target rate, optimizing the constellation tuning parameter may allow to lower the value of E (i.e., the transmission power/energy).

In one or more example methods, the constellation tuning parameter is a pre-determined parameter known to the receive node and to the transmit node. The constellation parameter may be optimized. The constellation parameter may be a predetermined value.

The constellation parameter may be a fixed value. For example, the constellation parameter may be set a predetermined value, for example, a=0.5. In one or more example methods, other values (such as smaller) provide superior rates at low SNR. In particular, $a=\sqrt{1/N}$ may be a performance choice, but for reasonable values of N (e.g. 3-6), the improvement when comparing to a=0.5 may be marginal. For various N and a=0.5, the resulting rates are illustrated in FIG. 6.

The method 100 comprises optionally determining S104, based on N, one or more physical resource elements for the modulation element. For example, the physical resource elements depend on N. A physical resource element may be seen as a time and frequency element, such as a subcarrier associated with a time slot. A physical resource element may be an element of a Physical Resource Block. For example, a Physical Resource Block comprises a plurality of resource elements (which may also be called blocks). For example, for N=12 or N=6, a Physical Resource Block, PRB, including 12 resource elements may be used for transmitting the modulation element. For example, for a Physical Resource Block, PRB, that has a pilot and includes 12 resource elements, N depends on 10 (due to the pilot taking 2 resource elements). The modulation element which can include at least one modulation symbol may be transmitted using the one or more physical resource elements determined based on N in S104.

In one or more example methods, the one or more physical resource elements are determined to be mutually orthogonal, when received at the receive node. For example, one or more physical resource elements are orthogonal at the receiver side after suitable processing at the receiver, (for example after removal of the CP).

In one or more example methods, the one or more physical resource elements are determined to be mutually orthogonal in frequency, and/or in time and/or in polarization and/or in a code domain. In one or more example methods, the one or more physical resource elements are determined to be mutually orthogonal in antenna ports, such as using different antenna ports. For example, a physical resource element may carry two real valued signals or one complex valued signal. The real valued signals from one modulation symbol may be combined with the real valued signals from another modulation symbol to form a complex value in a physical resource element.

In one or more example methods, determining S104, based on N, the physical resource elements for the modulation element comprises determining S104A, based on N, consecutive physical resource elements for the modulation element. In one or more example methods, determining S104, based on N, the physical resource elements for the modulation element comprises interleaving S104B the physical resource elements for the modulation element.

The method 100 comprises transmitting S106, to the receive node, the modulation element, using the physical resource elements.

In one or more example methods, mapping S102A the N+1 bits to the constellation point of the N-dimensional tuneable constellation comprises applying S102AA a modulation function mapping N+1 bits to N real values.

In one or more example methods, producing S102 the modulation element comprises applying S102B a linear transformation given by a matrix based on the constellation tuning parameter. In one or more example methods, the matrix is a matrix of dimension (N×(N+1)). The matrix can be a real matrix. In one or more example methods, the matrix comprises a diagonal matrix of dimension (N×N). In one or more example methods, the diagonal matrix is a scaled identity matrix, such as $$\begin{bmatrix} 1 & 0 & 0 & 0 \\ 0 & 1 & 0 & 0 \\ 0 & 0 & \ddots & 0 \\ 0 & 0 & 0 & 1 \end{bmatrix}$$

In one or more example methods, the matrix includes the constellation tuning parameter "a" as a column, such as $$\begin{bmatrix} 1 & 0 & 0 & 0 & a \\ 0 & 1 & 0 & 0 & a \\ 0 & 0 & \ddots & 0 & \vdots \\ 0 & 0 & 0 & 1 & a \end{bmatrix}$$

In one or more example methods, the method 100 comprises applying a power scaling parameter, e.g. to the modulation element. For example, after selecting the constellation tuning parameter, the N-dimensional tuneable constellation is re-normalized, (e.g. unit average energy). For example, the transmission power via "E" of Equation (1) is selected for producing the modulation element.

In one or more example methods, the method 100 comprises transmitting S102, to the receive node, control signalling indicative of the mapping.

In one or more example methods, the control signalling comprises capability signalling indicative of the mapping. In one or more example methods, the method comprises receiving S101, from the receive node, information indicative of the mapping to apply at the transmit node. In one or more example methods, the control signalling comprises a request to the receive node for activating a mapping. In one or more example methods, the method 100 comprises receiving, from the receive node, a response. In one or more example methods, the control signalling is indicative of the constellation tuning parameter.

Figure 8:
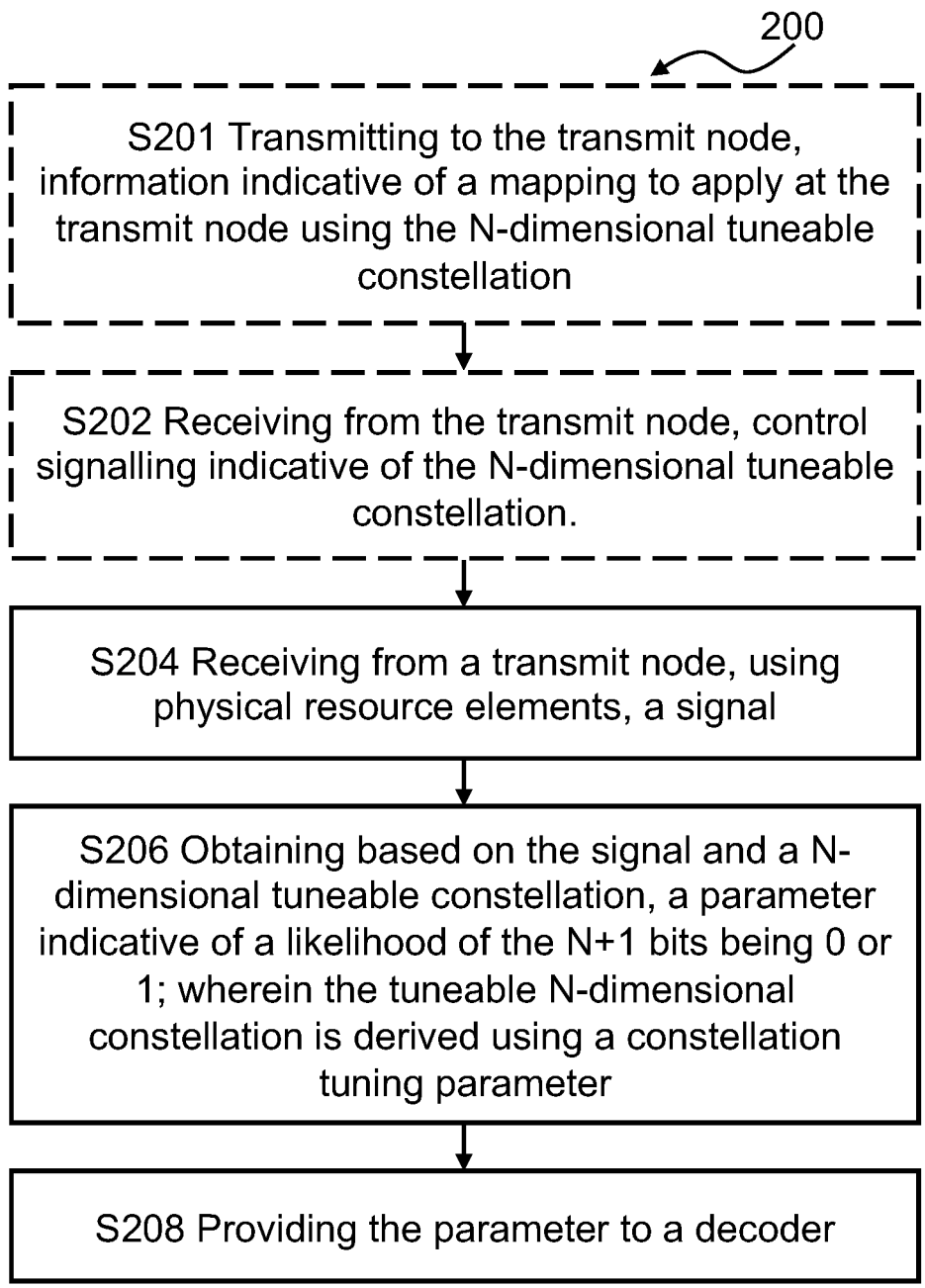
FIG. 8 is a flow-chart illustrating an example method, performed by a receive node of a wireless communication system, for receiving N+1 bits according to this disclosure.
Figure 10:
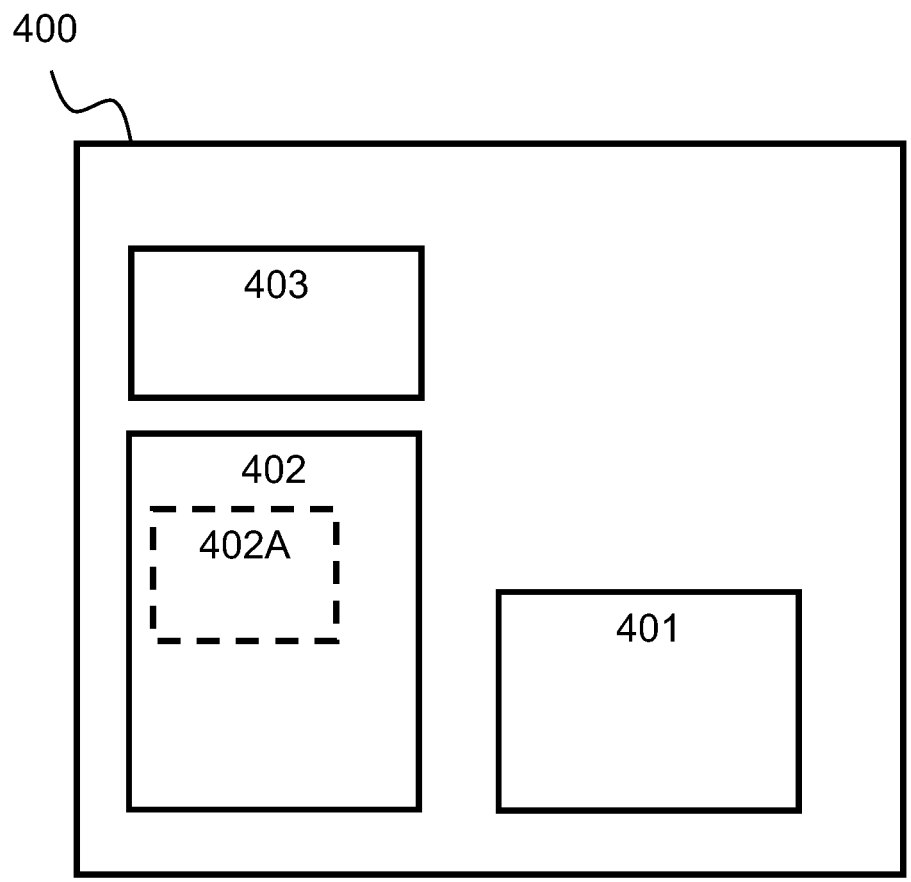
FIG. 10 is a block diagram illustrating an example receive node according to this disclosure.

FIG. 8 shows a flow diagram of an example method 200, performed by a receive node according to the disclosure, for example the disclosed receive node, such as receive node of FIGS. 1 and 10. The receive node is a network node or a wireless device.

The method 200 comprises receiving S204, from a transmit node, using physical resource elements, a signal. The signal received in S204 may be received from the transmit node transmitting the modulation element in S106 of FIG. 7

The method 200 can comprise obtaining S206, based on the signal and a N-dimensional tuneable constellation, a parameter indicative of a likelihood of the N+1 bits being 0 or 1.

The N-dimensional tuneable constellation is derived using a constellation tuning parameter. The N-dimensional tuneable constellation may be explained in relation to FIG. 7, FIG. 2, FIG. 4 and/or FIG. 5. In one or more example methods, the constellation tuning parameter is configured for obtaining a target transmission rate.

The parameter indicative of the likelihood of each of the N+1 bits being 0 or 1 may include: a posterior log-likelihood ratio and/or a Max-log-Maximum a posteriori, MAP, value. For example the posterior log-likelihood ration may be seen as a parameter providing a log value of the probability that a bit is 1 divided by the probability that the bit is 0. The term "posterior" may be seen as performing the log likelihood derivations after having a noisy observation of the modulation element and/or constellation point. This can also be calculated with reduced complexity with Max·log–MAP as illustrated in Equation (2).

In one or more example methods, the constellation tuning parameter is a pre-determined parameter known to the receive node and to the transmit node.

The method 200 can comprise providing S208, the parameter to a decoder. The decoder may benefit from a demodulation complexity that is reduced as illustrated with Equation (2).

In one or more example methods, the method 200 comprises receiving S202, from the transmit node, control signalling indicative of the N-dimensional tuneable constellation.

In one or more example methods, the control signalling comprises capability signalling indicative of the N-dimensional tuneable constellation.

In one or more example methods, the method 200 comprises transmitting S201, to the transmit node, information indicative of a mapping to apply at the transmit node using the N-dimensional tuneable constellation. In one or more example methods, the control signalling comprises a request from the transmit node, for activating a mapping. In one or more example methods, the method 200 comprises transmitting, to the transmit node, a response. In one or more example methods, the control signalling is indicative of the constellation tuning parameter.

FIG. 9 shows a block diagram of an example transmit node 300 according to the disclosure. The transmit node 300 comprises memory circuitry 301, processor circuitry 302, and a wireless interface 303. The transmit node 300 may be configured to perform any of the methods disclosed in FIG. 7. In other words, the transmit node 300 may be configured for transmitting N+1 bits using N modulation symbols.

The transmit node 300 is configured to communicate with a receive node, such as the receive node disclosed herein, using a wireless communication system.

The wireless interface 303 is configured for wireless communications via a wireless communication system, such as a 3GPP system, such as a 3GPP system supporting one or more of: New Radio, NR, Narrow-band IoT, NB-IoT, and Long-Term Evolution-enhanced Machine Type Communication, LTE-M, millimeter-wave communications, such as millimeter-wave communications in licensed bands, such as device-to-device millimeter-wave communications in licensed bands.

The transmit node 300 is configured to produce (e.g. via the processor circuitry 302) a modulation element. For example, the modulation element can be produced by the transmit node by mapping the N+1 bits to a constellation point of a N-dimensional tuneable constellation. The N-dimensional tuneable constellation can be derived using a constellation tuning parameter.

The transmit node 300 can be configured to determine (e.g. via the processor circuitry 302) based on N, one or more physical resource elements for the modulation element.

The transmit node 300 is configured to transmit (such as via the wireless interface 303), to the receive node, the modulation element, using the physical resource elements.

In one or more example transmit nodes, the modulation element comprises at least one modulation symbol corresponding to the constellation point.

In one or more example transmit nodes, the modulation element comprises one or more real values or one or more complex values.

In one or more example transmit nodes, the constellation tuning parameter is configured for obtaining a target transmission rate.

In one or more example transmit nodes, the constellation tuning parameter is a pre-determined parameter known to the receive node and to the transmit node.

The transmit node 300 can be configured to apply (e.g. via the processor circuitry 302) applying a power scaling parameter.

In one or more example transmit nodes, the matrix is a matrix of dimension (N×(N+1)).

In one or more example transmit nodes, the matrix comprises a diagonal matrix of dimension (N×N). In one or more example transmit nodes, the diagonal matrix is a scaled identity matrix. In one or more example transmit nodes, the matrix includes the constellation tuning parameter as a column.

In one or more example transmit nodes, the one or more physical resource elements are determined to be mutually orthogonal, when received at the receive node.

In one or more example transmit nodes, the one or more physical resource elements are determined to be mutually orthogonal in frequency, and/or in time and/or in polarization and/or in a code domain.

In one or more example transmit nodes, control signalling comprises capability signalling indicative of the mapping.

In one or more example transmit nodes, the control signalling comprises a request to the receive node for activating a mapping. In one or more example transmit nodes, the control signalling is indicative of the constellation tuning parameter.

The transmit node 300 is optionally configured to perform any of the operations disclosed in FIG. 7 (such as any one or more of S101, S102, S102A, S102AA, S102B, S104, S104A, S104B, S106). The operations of the transmit node 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the transmit node 300 may be considered a method that the transmit node 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 9). Memory circuitry 301 is considered a non-transitory computer readable medium.

Memory circuitry 301 may be configured to store the constellation tuning parameter, the N-dimensional tuneable constellation in a part of the memory.

FIG. 10 shows a block diagram of an example receive node 400 according to the disclosure. The receive node 400 comprises memory circuitry 401, processor circuitry 402, and a wireless interface 403. The receive node 400 may be configured to perform any of the methods disclosed in FIG. 8. In other words, the receive node 400 may be configured for receiving N+1 bits.

The receive node 400 is configured to communicate with a transmit node, such as the transmit node disclosed herein, using a wireless communication system.

The wireless interface 403 is configured for wireless communications via a wireless communication system, such as a 3GPP system, such as a 3GPP system supporting one or more of: New Radio, NR, Narrow-band IoT, NB-IoT, and Long-Term Evolution-enhanced Machine Type Communication, LTE-M, millimeter-wave communications, such as millimeter-wave communications in licensed bands, such as device-to-device millimeter-wave communications in licensed bands.

The receive node 400 is configured to receive (e.g., via the wireless interface 403), from a transmit node, using physical resource elements, a signal. The signal received may be received from the transmit node transmitting the modulation element in S106 of FIG. 7

The receive node 400 is configured to obtain (e.g., via the processor circuitry 402), based on the signal and a N-dimensional tuneable constellation, a parameter indicative of a likelihood of the N+1 bits being 0 or 1. The N-dimensional tuneable constellation is derived using a constellation tuning parameter. The N-dimensional tuneable constellation may be explained in relation to FIG. 7. In one or more example methods, the constellation tuning parameter is configured for obtaining a target transmission rate.

In one or more example receive nodes, the constellation tuning parameter is a pre-determined parameter known to the receive node and to the transmit node.

The receive node 400 is configured to provide (e.g. via the processor circuitry 402), the parameter to a decoder, such as decoder 402A. The transmit node 400 may comprise a decoder 402A. The decoder 402A may benefit from a demodulation complexity that is reduced as illustrated with Equation (2).

Processor circuitry 402 is optionally configured to perform any of the operations disclosed in FIG. 8 (such as any one or more of S201, S202, S204, S206, S208). The operations of the receive node 400 may be embodied in the form of executable logic routines (for example, lines of code, software programs, etc.) that are stored on a non-transitory computer readable medium (for example, memory circuitry 401) and are executed by processor circuitry 402).

Furthermore, the operations of the receive node 400 may be considered a method that the receive node 400 is configured to carry out. Also, while the described functions and operations may be implemented in software, such functionality may also be carried out via dedicated hardware or firmware, or some combination of hardware, firmware and/or software.

Memory circuitry 401 may be one or more of a buffer, a flash memory, a hard drive, a removable media, a volatile memory, a non-volatile memory, a random access memory (RAM), or other suitable device. In a typical arrangement, memory circuitry 401 may include a non-volatile memory for long term data storage and a volatile memory that functions as system memory for processor circuitry 402. Memory circuitry 401 may exchange data with processor circuitry 402 over a data bus. Control lines and an address bus between memory circuitry 401 and processor circuitry 402 also may be present (not shown in FIG. 10). Memory circuitry 401 is considered a non-transitory computer readable medium.

Memory circuitry 401 may be configured to store the constellation tuning parameter and the N-dimensional tuneable constellation in a part of the memory.

Examples of methods and products (network node and wireless device) according to the disclosure are set out in the following items:

Item 1. A method, performed by a transmit node, for transmitting N+1 bits to a receive node, wherein N is a positive integer, the method comprising:
  producing (S102) a modulation element by mapping (S102A) the N+1 bits to a constellation point of a N-dimensional tuneable constellation, wherein the N-dimensional tuneable constellation is derived using a constellation tuning parameter;
  determining (S104), based on N, one or more physical resource elements for the modulation element; and
  transmitting (S106), to the receive node, the modulation element, using the physical resource elements.

Item 2. The method according to item 1, wherein the modulation element comprises at least one modulation symbol corresponding to the constellation point.

Item 3. The method according to any of the previous items, wherein the modulation element comprises one or more real values or one or more complex values.

Item 4. The method according to any of the previous items, wherein the constellation tuning parameter is configured for obtaining a target transmission rate.

Item 5. The method according to any of the previous items, wherein the constellation tuning parameter is a pre-determined parameter known to the receive node and to the transmit node.

Item 6. The method according to any of the previous items, the method comprising applying a power scaling parameter.

Item 7. The method according to any of the previous items, wherein mapping (S102A) the N+1 bits to the constellation point of the N-dimensional tuneable constellation comprises applying (S102AA) a modulation function mapping N+1 bits to N real values.

Item 8. The method according to any of the previous items, wherein producing (S102) the modulation element comprises applying (S102B) a linear transformation given by a matrix based on the constellation tuning parameter.

Item 9. The method according to item 8, wherein the matrix is a matrix of dimension (N×(N+1)).

Item 10. The method according to any of items 8-9, wherein the matrix comprises a diagonal matrix of dimension (N×N).

Item 11. The method according to item 10, wherein the diagonal matrix is a scaled identity matrix.

Item 12. The method according to any of items 8-10, wherein the matrix includes the constellation tuning parameter as a column.

Item 13. The method according to any of the previous items, wherein the one or more physical resource elements are determined to be mutually orthogonal, when received at the receive node.

Item 14. The method according to any of the previous items, wherein the one or more physical resource elements are determined to be mutually orthogonal in frequency, and/or in time and/or in polarization and/or in a code domain.

Item 15. The method according to any of the previous items, wherein determining (S104), based on N, the physical resource elements for the modulation element comprises determining (S104A), based on N, consecutive physical resource elements for the modulation element.

Item 16. The method according to any of the previous items, wherein determining (S104), based on N, the physical resource elements for the modulation element comprises interleaving (S104B) the physical resource elements for the modulation element.

Item 17. The method according to any of the previous items, the method comprising transmitting (S102), to the receive node, control signalling indicative of the mapping.

Item 18. The method according to item 17, wherein the control signalling comprises capability signalling indicative of the mapping.

Item 19. The method according to any of the previous items, the method comprising receiving (S101), from the receive node, information indicative of the mapping to apply at the transmit node.

Item 20. The method according to any of items 17-19, wherein the control signalling comprises a request to the receive node for activating a mapping and wherein the method comprises receiving, from the receive node, a response.

Item 21. The method according to any of items 17-20, wherein the control signalling is indicative of the constellation tuning parameter.

Item 22. A method, performed by a receive node, for reception of N+1 bits, the method comprising:
  receiving (S204), from a transmit node, using physical resource elements, a signal;
  obtaining (S206), based on the signal and a N-dimensional tuneable constellation, a parameter indicative of a likelihood of the N+1 bits being 0 or 1; wherein the N-dimensional tuneable constellation is derived using a constellation tuning parameter; and
  providing (S208), the parameter to a decoder.

Item 23. The method according to item 22, wherein the constellation tuning parameter is configured for obtaining a target transmission rate.

Item 24. The method according to any of items 22-23, wherein the constellation tuning parameter is a pre-determined parameter known to the receive node and to the transmit node.

Item 25. The method according to any of items 22-23, the method comprising receiving (S202), from the transmit node, control signalling indicative of the N-dimensional tuneable constellation.

Item 26. The method according to item 25, wherein the control signalling comprises capability signalling indicative of the N-dimensional tuneable constellation.

Item 27. The method according to any of items 22-26, the method comprising transmitting (S201), to the transmit node, information indicative of a mapping to apply at the transmit node using the N-dimensional tuneable constellation.

Item 28. The method according to any of items 25-27, wherein the control signalling comprises a request from the transmit node, for activating a mapping and wherein the method comprises transmitting, to the transmit node, a response.

Item 29. The method according to any of items 25-28, wherein the control signalling is indicative of the constellation tuning parameter.

Item 30. A transmit node comprising memory circuitry, processor circuitry, and a wireless interface, wherein the transmit node is configured to perform any of the methods according to any of items 1-21.

Item 31. A receive node comprising memory circuitry, processor circuitry, and a wireless interface, wherein the receive node is configured to perform any of the methods according to any of items 22-29.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that Figures comprise some circuitries or operations which are illustrated with a solid line and some circuitries, components, features, or operations which are illustrated with a dashed line. Circuitries or operations which are comprised in a solid line are circuitries, components, features, or operations which are comprised in the broadest example. Circuitries, components, features, or operations which are comprised in a dashed line are examples which may be comprised in, or a part of, or are further circuitries, components, features, or operations which may be taken in addition to circuitries, components, features, or operations of the solid line examples. It should be appreciated that these operations need not be performed in order presented. Furthermore, it should be appreciated that not all of the operations need to be performed. The example operations may be performed in any order and in any combination. It should be appreciated that these operations need not be performed in order presented. Circuitries, components, features, or operations which are comprised in a dashed line may be considered optional.

Other operations that are not described herein can be incorporated in the example operations. For example, one or more additional operations can be performed before, after, simultaneously, or between any of the described operations.

Certain features discussed above as separate implementations can also be implemented in combination as a single implementation. Conversely, features described as a single implementation can also be implemented in multiple implementations separately or in any suitable sub-combination. Moreover, although features may be described above as acting in certain combinations, one or more features from a claimed combination can, in some cases, be excised from the combination, and the combination may be claimed as any sub-combination or variation of any sub-combination It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes, and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

The invention claimed is:

1. A method, performed by a transmit node, for transmitting N+1 bits to a receive node, wherein N is a positive integer, the method comprising:
   producing a modulation element by mapping the N+1 bits to a constellation point of a N-dimensional tuneable constellation, wherein the N-dimensional tuneable constellation is derived using a constellation tuning parameter;
   determining, based on N, one or more physical resource elements for the modulation element; and
   transmitting, to the receive node, the modulation element, using the one or more physical resource elements.

2. The method according to claim 1, wherein the modulation element comprises at least one modulation symbol corresponding to the constellation point.

3. The method according to claim 1, wherein the modulation element comprises one or more real values or one or more complex values.

4. The method according to claim 1, wherein the constellation tuning parameter is configured for obtaining a target transmission rate.

5. The method according to claim 1, wherein the constellation tuning parameter is a pre-determined parameter known to the receive node and to the transmit node.

6. The method according to claim 1, the method comprising applying a power scaling parameter.

7. The method according to claim 1, wherein mapping the N+1 bits to the constellation point of the N-dimensional tuneable constellation comprises applying a modulation function mapping N+1 bits to N real values.

8. The method according to claim 1, wherein producing the modulation element comprises applying a linear transformation given by a matrix based on the constellation tuning parameter.

9. The method according to claim 8, wherein the matrix is a matrix of dimension (N×(N+1)) and/or wherein the matrix comprises a diagonal matrix of dimension (N×N).

10. The method according to claim 9, wherein the diagonal matrix is a scaled identity matrix.

11. The method according to claim 8, wherein the matrix includes the constellation tuning parameter as a column.

12. The method according to claim 1, wherein the one or more physical resource elements are determined to be mutually orthogonal, when received at the receive node.

13. The method according to claim 1, wherein the one or more physical resource elements are determined to be mutually orthogonal in frequency, and/or in time and/or in polarization and/or in a code domain.

14. The method according to claim 1, wherein determining, based on N, the one or more physical resource elements for the modulation element comprises determining, based on N, consecutive physical resource elements for the modulation element.

15. The method according to claim 1, wherein determining, based on N, the one or more physical resource elements for the modulation element comprises interleaving the one or more physical resource elements for the modulation element.

16. The method according to claim 1, the method comprising transmitting, to the receive node, control signalling indicative of the mapping.

17. The method according to claim 16, wherein the control signalling comprises capability signalling indicative of the mapping.

18. The method according to claim 1, the method comprising receiving, from the receive node, information indicative of the mapping to apply at the transmit node.

19. The method according to claim 16, wherein the control signalling comprises a request to the receive node for activating a mapping and wherein the method comprises receiving, from the receive node, a response.

20. The method according to claim 16, wherein the control signalling is indicative of the constellation tuning parameter.

21. A method, performed by a receive node, for reception of N+1 bits, the method comprising:
   receiving, from a transmit node, using physical resource elements, a signal;
   obtaining, based on the signal and a N-dimensional tuneable constellation, parameter indicative of a likelihood of the N+1 bits being 0 or 1; wherein the N dimensional tuneable constellation is derived using a constellation tuning parameter; and
   providing, the parameter to a decoder.

22. The method according to claim 21, wherein the constellation tuning parameter is configured for obtaining a target transmission rate.

23. The method according to claim 21, wherein the constellation tuning parameter is a pre-determined parameter known to the receive node and to the transmit node.

24. The method according to claim 21, the method comprising receiving, from the transmit node, control signalling indicative of the N-dimensional tuneable constellation.

25. The method according to claim 24, wherein the control signalling comprises capability signalling indicative of the N-dimensional tuneable constellation.

26. The method according to claim 21, the method comprising transmitting, to the transmit node, information indicative of a mapping to apply at the transmit node using the N-dimensional tuneable constellation.

27. The method according to claim 24, wherein the control signalling comprises a request from the transmit node, for activating a mapping and wherein the method comprises transmitting, to the transmit node, a response.

28. The method according to claim 24, wherein the control signalling is indicative of the constellation tuning parameter.

29. The transmit node comprising memory circuitry, processor circuitry, and a wireless interface, wherein the transmit node is configured to perform the method according to claim 1.

30. The receive node comprising memory circuitry, processor circuitry, and a wireless interface, wherein the receive node is configured to perform the method according to claim 21.

* * * * *